(12) United States Patent
Hughes et al.

(10) Patent No.: US 7,712,086 B2
(45) Date of Patent: May 4, 2010

(54) PORTABLE APPLICATIONS

(75) Inventors: Aidan T. Hughes, Bellevue, WA (US);
Paul C. Barr, Redmond, WA (US);
Anzhelika Y. Nishanova, Redmond, WA (US);
David A. Yalovsky, Seattle, WA (US);
J. Anthony East, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 906 days.

(21) Appl. No.: 11/012,926

(22) Filed: Dec. 15, 2004

(65) Prior Publication Data

US 2006/0130004 A1    Jun. 15, 2006

(51) Int. Cl.
*G06F 9/44* (2006.01)

(52) U.S. Cl. ...................................... 717/131
(58) Field of Classification Search ........................ None
See application file for complete search history.

(56) References Cited

U.S. PATENT DOCUMENTS

| | | | |
|---|---|---|---|
| 5,845,128 A | 12/1998 | Noble et al. | |
| 6,216,158 B1 | 4/2001 | Luo et al. | |
| 6,324,590 B1 | 11/2001 | Jeffords et al. | |
| 6,343,287 B1 | 1/2002 | Kumar et al. | |
| 6,374,402 B1 | 4/2002 | Schmeidler et al. | |
| 6,442,570 B1 | 8/2002 | Wu | |
| 6,738,766 B2 | 5/2004 | Peng | |
| 6,850,986 B1 | 2/2005 | Peacock | |
| 6,868,451 B1 | 3/2005 | Peacock | |
| 6,895,401 B2 | 5/2005 | Skinner et al. | |
| 6,918,113 B2 | 7/2005 | Patel et al. | |
| 7,080,279 B2 | 7/2006 | Asare et al. | |
| 2002/0085579 A1 | 7/2002 | Sullivan et al. | |
| 2004/0083473 A1* | 4/2004 | Thomas et al. | 717/174 |
| 2004/0172427 A1* | 9/2004 | Thomas et al. | 707/204 |
| 2004/0215700 A1 | 10/2004 | Shenfield et al. | |
| 2005/0006461 A1* | 1/2005 | Shenker et al. | 235/380 |
| 2005/0038773 A1 | 2/2005 | Gray et al. | |
| 2005/0050084 A1 | 3/2005 | Atm | |
| 2005/0066073 A1* | 3/2005 | Jacobs et al. | 710/15 |
| 2005/0071378 A1* | 3/2005 | Smith | 707/200 |
| 2005/0083741 A1* | 4/2005 | Chang et al. | 365/200 |

(Continued)

FOREIGN PATENT DOCUMENTS

WO    WO0029945 A    5/2000

(Continued)

OTHER PUBLICATIONS

Ellison; "Feature-Rich Flash Drives, Part I"; PC Magazine; Mar. 18, 2004; 5 pages; http://www.pcmag.com/print_article2/0,2533,a=121992,00.asp.

(Continued)

*Primary Examiner*—Philip Wang
(74) *Attorney, Agent, or Firm*—Lee & Hayes, PLLC (57) ABSTRACT

A portable storage device includes an interface and one or more flash memories. The one or more flash memories store one or more executable files that can be executed by a host computer to which the device is coupled without altering any environment settings on the host computer even though the one or more executable files include instructions to access environment settings. Additionally, the application is bound to the portable storage device during an activation process.

13 Claims, 6 Drawing Sheets

U.S. PATENT DOCUMENTS

| | | |
|---|---|---|
| 2005/0114300 A1 | 5/2005 | Khalid et al. |
| 2005/0169073 A1 | 8/2005 | Cook et al. |
| 2005/0210501 A1 | 9/2005 | Zigmond et al. |
| 2006/0026414 A1* | 2/2006 | Firebaugh et al. .............. 713/1 |
| 2006/0190580 A1 | 8/2006 | Shu et al. |
| 2007/0016695 A1 | 1/2007 | Rabbers et al. |

FOREIGN PATENT DOCUMENTS

| | | |
|---|---|---|
| WO | WO2004093149 A | 10/2004 |

OTHER PUBLICATIONS

"Iomega Launches New Mini USB Drive Key-Sized Drive Debuts at Comdex Fall 2002 Show in Las Vegas"; Nov. 14, 2002, 4 pages.

"DiskOnKey Pro", Nov. 10, 2004, Web pages from http://www.diskonkey.com/prod_dokpro.asp., 2 pages.

"Curtailing the Piracy Epidemic: A Case for Hardware Security Keys"; Rainbow Technologies, Jun. 17, 2002, 7 pages.

"Protect Your Software and Increase Your Revenues", Sentinel SuperPro, SafeNet, 2 pages, printed Nov. 2, 2004.

* cited by examiner

PORTABLE APPLICATIONS

TECHNICAL FIELD

This invention relates to memory devices and applications, and particularly to portable applications.

BACKGROUND

Computers have become commonplace in our lives, being found in our homes and workplaces as well as a growing variety of public places such as libraries, airports, cafes, and so forth. As people have become more reliant on computers, their desire to use computers wherever they may happen to be has also grown. For example, when users are traveling away from their home or office, they frequently desire to access programs and/or data that they are accustomed to accessing from their home or office. However, this is problematic because users cannot rely on their desired programs being available on computers away from their home or office, much less on their desired data being available on computers away from their home or office.

One solution that can be used to solve these problems is for users to purchase and travel with a portable computer. Portable computers, however, have additional problems in that they can be bulky and heavy to travel with, expensive to purchase, and can make the user a target for theft.

Another solution that can be used to solve these problems is for users to take their hard drive with them when they travel. Such a solution can also be problematic because it requires a significant amount of effort to open and disconnect the hard drive from their computer as well as install the hard drive in another computer, leaves their computer without the hard drive and thus typically unusable, raises compatibility issues because significant reconfiguration may be required for the hard drive to work on the other computer, and can raise legal issues because the user may not be permitted to open and tamper with computers in public places.

Another solution that can be used to solve at least part of these problems is to store data to a Universal Serial Bus (USB) flash memory device. These USB flash memory devices have become increasingly commonplace and plug into a USB port on a computer. Such a USB device allows a user to transfer data from one computer to the USB device, then plug the USB device into another computer and access the data on the USB device. Such USB devices, however, solve only part of the problem because they are commonly used only for storing data. If the computer that the user is using does not have the proper program, then the data is typically not accessible to the user in a useful form.

Another solution that can be used to solve at least part of these problems is for the user to travel with the program on disc (typically CD or DVD), and if the program is not available on the computer he or she is using, then the user can install the program on that computer. This solution, however, solves only part of the problem because such a disc typically would not have the user's data stored on it. Furthermore, this solution has additional problems because the discs are somewhat fragile and could be damaged during travel, the process of installing the program on the computer can be time-consuming (and even more time-consuming if the program is incompatible with other programs running on the computer), the user may not have sufficient usage privileges on the computer to install the program, such installation onto multiple computers will oftentimes violate the licensing agreement for the program, and the owner of the computer (particularly in public locations) typically will not want people installing their own programs onto the computer. Yet another problem with this solution is that when the user uninstalls the program on the computer, various unused registration information, data, and so forth is oftentimes left behind.

Thus, it would be beneficial to have an improved way for users to travel from computer to computer and easily use their desired programs, and optionally their desired data.

SUMMARY

Portable applications are described herein.

In accordance with certain aspects, a portable storage device includes an interface and one or more storage elements. The one or more storage elements store one or more executable files that can be executed by a host computer to which the device is coupled without altering any environment settings on the host computer even though the one or more executable files include instructions to access environment settings.

In accordance with other aspects, an application is bound to a portable storage device that stores one or more executable files to be executed to run the application.

In accordance with other aspects, a request is received to install a portable application on a portable storage device coupled to the computer. One or more executable files for the portable application are written to the portable storage device, and information regarding the portable application is written to a private store on the portable storage device.

BRIEF DESCRIPTION OF THE DRAWINGS

The same numbers are used throughout the document to reference like components and/or features.

DETAILED DESCRIPTION

Portable applications are described herein. One or more application programs are installed on a portable storage device. When the portable storage device is plugged into or otherwise coupled to a computer, the portable application(s) installed on the device are automatically detected and made available to the user, along with any data that the user may have stored on the device. The portable application(s) do not alter any environment settings on the computer, and the data files remain on the portable storage device. The user thus has access to the application(s) and data that he or she desires, while not leaving behind any altered environment settings or data files after he or she is finished using the computer.

Figure 1:
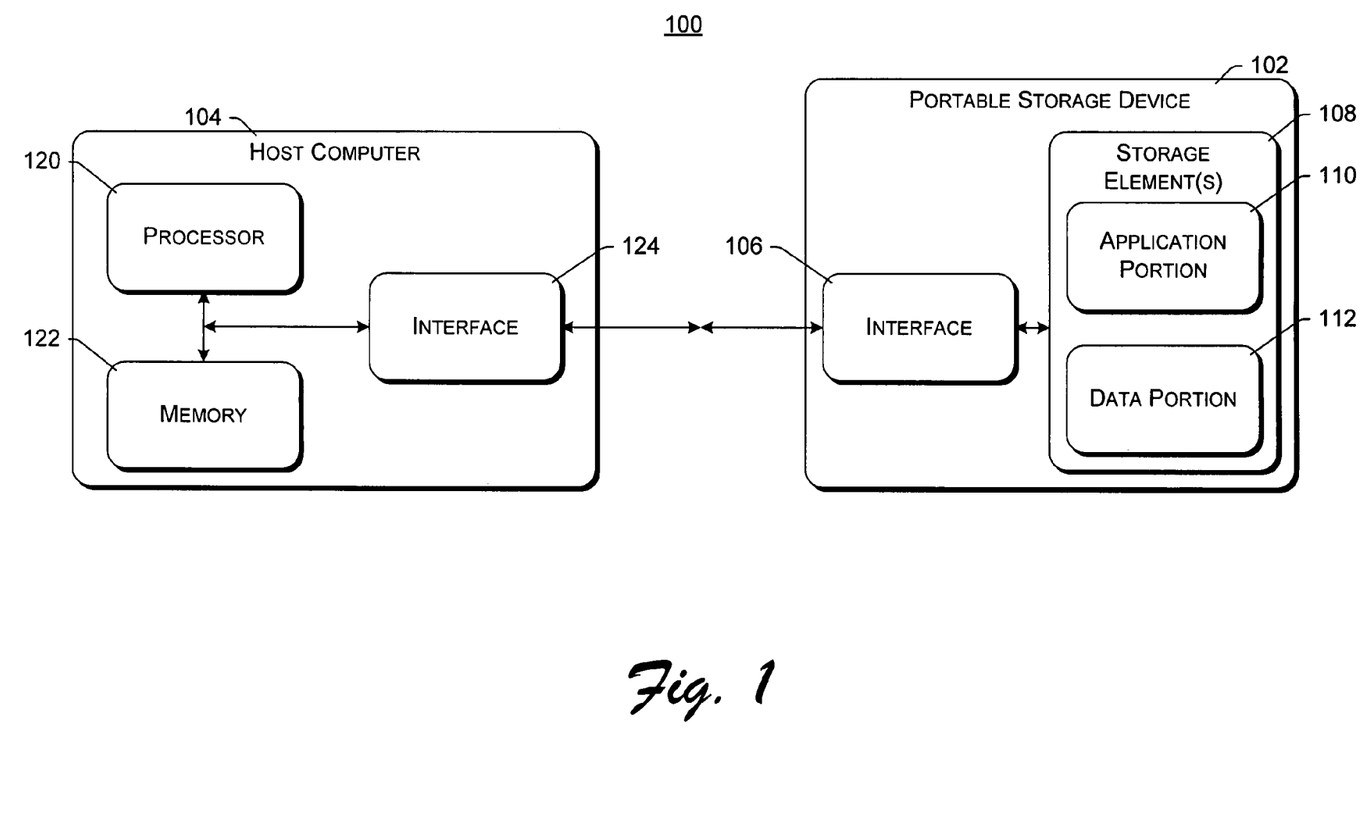
FIG. 1 is a block diagram illustrating an example environment in which portable applications can be used.

FIG. 1 is a block diagram illustrating an example environment in which the portable applications can be used. Environment 100 includes a portable storage device 102 and a host computer 104. Portable storage device 102 can be coupled to and easily removed from host computer 104, as well as multiple other computers (not shown in FIG. 1). Portable storage device 102 can communicate with host computer 104 using any of a variety of protocols. For example, device 102 may couple to computer 104 using a Universal Serial Bus (USB) connection, such as USB version 1.0 or version 2.0, or using an IEEE 1394 connection (sometimes referred to as Firewire) connection, such as IEEE 1394a or 1394b, or using a Personal Computer Memory Card International Association (PCM-CIA) connection. Alternatively, device 102 may couple to computer 104 using any of a variety of other public or proprietary connection protocols.

The connection protocol used to couple device 102 to computer 104 is typically a "plug and play" connection protocol. Plug and play connection protocols refer to protocols that allow the host computer to automatically detect and configure itself to access peripheral devices connected thereto. When a peripheral device is plugged into computer 104, computer 104 can automatically identify and install any device drivers or other modules that need to be running on computer 104 in order for programs running on computer 104 to be able to access the peripheral device.

Portable storage device 102 includes an interface 106 and one or more storage elements 108, while computer 104 includes a processor 120, a system memory 122 (e.g., random access memory (RAM)), and an interface 124. Interfaces 106 and 124 allow device 102 and computer 104 to transfer signals between one another in accordance with the connection protocol. These signals can be data signals and/or command signals.

Storage element(s) 108 can be made up of one or more of a variety of different types of storage elements, such as one or more flash memories, one or more magnetic hard disk drives (e.g., micro drives), one or more optical disk drives, and so forth. Storage element(s) 108 includes an application portion 110 and a data portion 112. Application portion 110 can store one or more portable applications that can be executed by processor 120 of computer 104. Portable applications are applications that are designed to run from storage element 108 without altering any environment settings on host computer 104 even though the applications include requests to access environment settings. Portable applications are also typically bound to portable storage device 102, as discussed in more detail below.

Data portion 112 can store data for one or more applications. Data stored in portion 112 can be for one of the portable applications stored in portion 110 and/or other applications.

Processor 120 of computer 104 communicates with system memory 122 and interface 124 to execute applications, including applications stored in storage element 108. Each application stored in application portion 110 is a set of instructions that can be executed by processor 120, referred to as executing or running the application. These instructions can be loaded and executed by processor 120 directly from storage element 108, or alternatively may be transferred to system memory 122 before being loaded and executed by processor 120. These instructions may also be transferred from storage element 108 into one or more cache memories in computer 104 prior to being executed by processor 120.

Portable storage device 102 can be coupled to computer 104 by being plugged into computer 104. This coupling of device 102 to computer 104 can be a direct connection or an indirect connection. Portable storage device 102 can be directly connected to computer 104, such as a jack or connector on device 102 being inserted into a jack or connector on computer 104. Portable storage device 102 can also be indirectly connected to computer 104, such as by way of one or more cables or extension wires, one or more other controllers (e.g., a USB hub(s)), one or more other peripheral devices, and so forth. The coupling between computer 104 and portable storage device 102 may be a wired and/or wireless coupling. Portable storage device 102 is referred to as being portable because it is designed to be easily coupled to and de-coupled from one or more computers 104 by an end user, as well as easily transported by the user.

When portable storage device 102 is coupled to computer 104, computer 104 automatically detects the presence of device 102. This detection is performed, for example, as part of the plug and play connection protocol. Once detected, portable storage device 102 is accessible to applications and the operating system executing on computer 104 for data storage as well as application execution.

After portable storage device 102 is detected, computer 104 automatically accesses device 102 and can run any applications stored in application portion 110, and/or give the user of computer 104 the option to run any of the applications stored in application portion 110. Data portion 112 is also accessible to computer 104, allowing computer 104 to retrieve any data stored in portion 112 as well as store new data to portion 112.

Many current operating systems include the appropriate device drivers to allow portable storage devices to be accessed. If such device drivers are not installed when portable flash memory device 102 is coupled to computer 104, then such device drivers are installed (e.g., as part of the plug and play control protocol). It should be noted, however, that no additional device drivers or other drivers or software need be installed on host computer 104 in order for portable applications on portable storage device 102 to be executed. For example, no drivers specific to any particular portable application, or to portable applications in general, need be installed on host computer 104.

Figure 2:
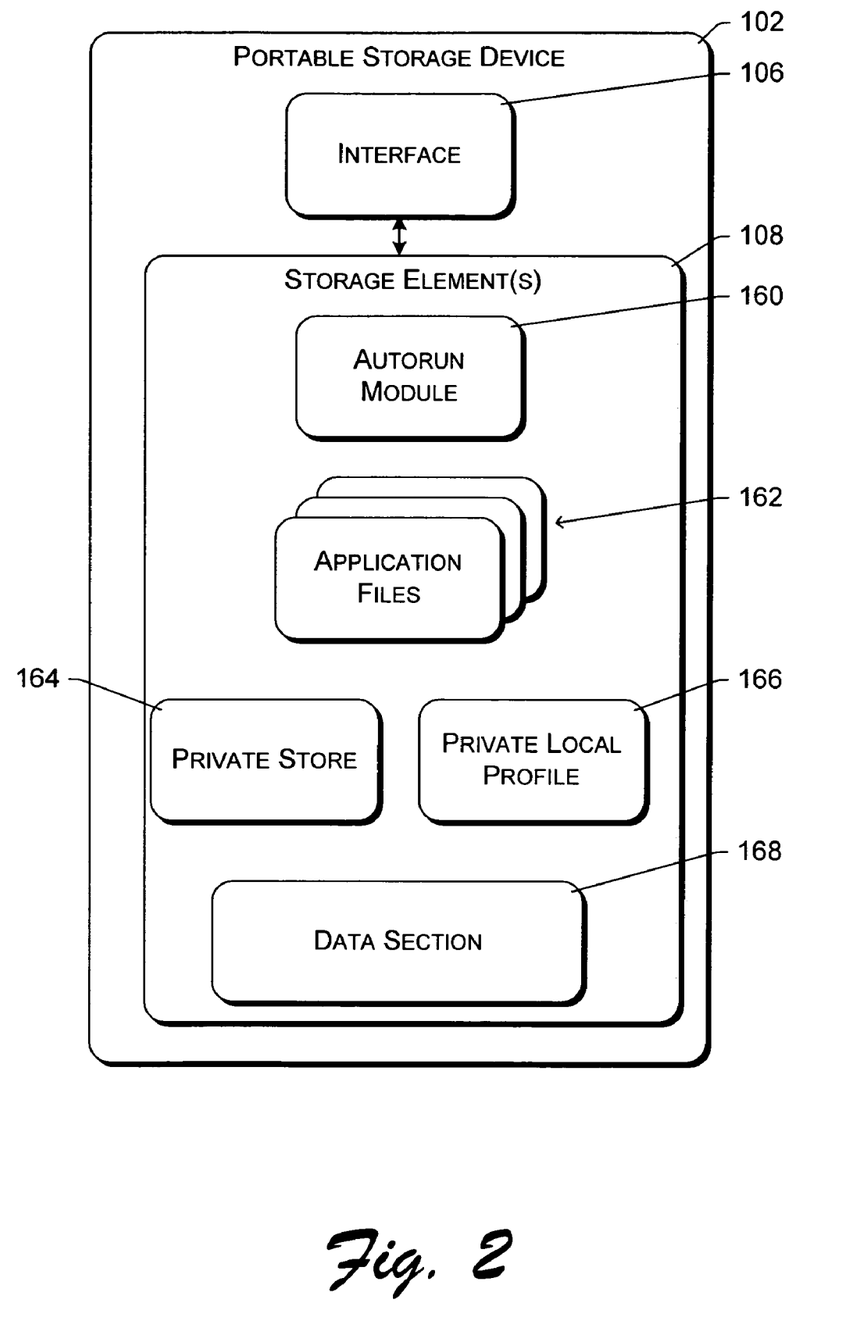
FIG. 2 illustrates an example portable storage device in additional detail.

FIG. 2 illustrates an example portable storage device in additional detail. Portable storage device 102 includes an interface 106 and storage element(s) 108. Storage element 108 includes an autorun module 160, one or more application files 162, private store 164, private local profile 166, and data section 168. Data section 168 is included in data portion 112 of FIG. 1, while application files 162 are included in application portion 110 of FIG. 1. Autorun module 160 is typically included in application portion 110, although module 160 may alternatively be included in data portion 112. Private store 164 and private local profile 166 are both typically included in data portion 112, although store 164 and profile 166 may alternatively be included in application portion 110.

It should be noted that portable storage device 102 does not include a processor for executing the portable application(s). Portable storage device 102 is not a portable or handheld computer; rather, portable storage device 102 is a storage device. However, in certain embodiments portable storage device 102 may include a processor to be used for security purposes or encryption, but not for executing the portable application(s) stored on portable storage device 102.

Autorun module 160 is executed to access the applications stored on portable storage device 102. Autorun module 160 is programmed with the knowledge of which applications are stored on portable storage device 102, or with the knowledge of how to determine which applications are stored on portable storage device 102 (such as by accessing a data file including the information, scanning storage element 108 to look for application modules, etc.), as well as how to execute those applications. Autorun module 160 can then identify to the operating system on the host device to which portable storage device 102 is coupled which application file(s) 162 should be loaded and executed in order to execute a desired application.

The desired application can be selected, for example, by the user or may be automatically programmed into autorun module 160.

Autorun module 160 optionally displays a user interface that presents various options to the user for interacting with portable storage device 102. These options can include, for example, a listing of applications that are stored on portable storage device 102 and that can be run by the user, and a listing of data files that are stored on portable storage device 102 and that can be accessed by the user (e.g., read, deleted, copied, etc.). The user interface may also serve as a destination where the user can drag and drop file icons in order to copy the corresponding files to portable storage device 102. The user interface may also support a browsing functionality, leveraging the operating system on the host device to which portable storage device 102 is coupled to allow a user to access different folders or directories on portable storage device 102 as well as other storage devices of the host device and even other storage devices coupled to the host device via one or more networks.

Autorun module 160 also allows particular file types to be associated with particular portable applications of device 102. For example, one type of file may be files with names ending in ".doc" which can be associated with a word processing portable application, while another type of file may be files with, names ending in ".xls" which can be associated with a spreadsheet portable application. The association of particular file types to particular portable applications may be maintained within autorun module 160, in private store 164, or alternatively elsewhere on device 102. The association of particular file types with particular portable applications is implemented by device 102 (e.g., by autorun module 160 using data stored in private store 164), rather than the host device to which device 102 is coupled.

Associating particular file types with particular portable applications allows autorun module 160 to automatically run the correct portable application when a file of an associated type is selected by the user (e.g., by the user double-clicking on an icon representing the file, by the user using a keyboard to navigate to an icon or name representing the file, and so forth). For example, if files with names ending in ".doc" are associated with a word processing portable application, then if the user selects "MyReport.doc", then autorun module 160 can automatically run the word processing portable application and load the MyReport.doc document into the word processing portable application.

Associating particular file types with particular portable applications also allows autorun module 160 to present, as part of its user interface, particular icons representing files of particular types. For example, a particular icon that identifies the word processing portable application may be displayed for all files with names ending in ".doc". The particular icon to display for a particular file type may be maintained within autorun module 160, in private store 164, or alternatively elsewhere on device 102.

In certain embodiments, autorun module 160 is automatically loaded and executed by an operating system of a host device to which portable storage device 102 is coupled. In such embodiments, the operating system on the host device is configured to automatically search for autorun module 160 whenever it detects that a portable storage device has been coupled to the host device. For example, the operating system may search the storage element 108 or a particular one or more folders or directories of files on storage element 108 for an autorun module having a particular name (such as "Autorun.inf"), access a particular known location of storage element 108, and so forth. When autorun module 160 is found, the operating system executes the instructions in autorun module 160.

Alternatively, execution of autorun module 160 can be initiated in other manners. For example, rather than being automatically run when portable storage device 102 is coupled to the host device, the user of the host device may access portable storage device 102 through the operating system in a conventional manner. The user may then locate a file name or icon corresponding to autorun module 160 by navigating through the directories or folders stored on storage element 108 and select that file name or icon for execution (e.g., by double-clicking on the file name or icon).

In alternate embodiments, rather than using autorun module 160, the user (or alternatively another application or the operating system) can manually navigate through the directories or folders stored on storage element 108 to identify portable applications to execute. For example, if host computer 104 is running one of the Windows® operating systems, then the user can manually search through the folders in storage element 108 using the Windows® operating system Explorer.

Application files 162 include the instructions, which may be organized as one or more application modules, used for running the portable applications, as well as any associated data files used for running the portable applications. Application files 162 are the executable files and any other associated files for the portable applications stored on portable storage device 102. In order to run a portable application, one or more of these executable files are executed by the host computer. Any of a variety of different applications can be included as portable applications on portable storage device 102. Examples of such applications include word processing applications, spreadsheet applications, database applications, presentation applications, reference applications, game applications, electronic mail (email) clients, and so forth. These applications may be portable versions of the same applications that are designed to be installed and run on desktop computers. For example, there may be a portable version of the Microsoft® Word word processing application. The portable versions may have reduced functionality over their corresponding desktop versions. For example, certain functionality in applications may not lend itself to working with a portable application, such as functionality that requires an extension to be registered in a system registry of the host device (which would be a change to an environment setting that portable applications do not make, as discussed in more detail below).

Many operating systems employ a system information store to maintain configuration data for the operating system running on a computer as well as applications installed on the computer. In the Microsoft® Windows® operating system family, such a system information store is typically referred to as the system registry. The system registry can store, for example, device and application configuration settings, associations of file types (e.g., based on their extensions) with particular applications, user preferences, performance tuning parameters, and so forth. Typically, during installation of an application on a computer, various information regarding the configuration settings for the application is written to the system information store. In contrast, no such settings are written to the system information store for a portable application on portable storage device 102.

In order for the portable application to communicate with other applications, without maintaining information about the portable application in a system information store, the portable applications make use of runtime querying of the environment. Runtime querying of the environment refers to a technique where applications can issue a query for which other application(s) offer particular functionality. In response to such a query, if the portable application offers the functionality then the portable application responds to the query with information identifying how the functionality can be invoked. This querying is typically brokered through the operating system, so that rather than one application querying the other applications directly, the application queries the operating system which in turn queries the other applications and returns the results of that querying to the application. Thus, rather than checking the system information store for information on how to invoke particular functionality of the portable application, the application can be queried to obtain the information on how to invoke that particular functionality.

Although no data about the portable application is written to the system information store, the portable application itself may be designed to access an information store, including writing data to and reading data from the information store. In order to accommodate such access, private store 164 is included on portable storage device 102. Private store 164 maintains the settings information for the portable applications—settings information that would typically be maintained in a system information store of the host computer is instead maintained in private store 164. A separate private store 164 may be maintained for each portable application, or alternatively a single private store 164 may be maintained for a collection or suite of portable applications.

Each portable application is designed to access private store 164 rather than the system information store on the host computer. Thus, any data that a portable application may write to an information store is written to private store 164 on the same portable storage device 102 as the portable application files, so the system information store on the host computer would have no configuration or other data for the portable application written to it. In certain implementations where the host computer includes a system registry, as private store 164 is accessed by the portable applications rather than the system registry, private store 164 may also be referred to as a private registry.

The portable applications can be designed to access private store 164 rather than the system information store on the host computer in different ways. In certain embodiments, the system information store on the host computer includes an application programming interface (API) having multiple interfaces that can be invoked by applications in order to access the system information store. This access can include, for example, reading values from the information store, writing values to the information store, deleting values from the information store, modifying values in the information store, and so forth. Private store 164 includes a similar API, having similar interfaces that typically perform the same functionality as the interfaces of the system information store, but having different names and operating on private store 164 rather than the system information store. In certain implementations, these private store interfaces are invoked by the portable applications rather than the system information store interfaces.

In other implementations, the portable applications access the private store interfaces through an intermediary. A single intermediary may operate as an intermediary for one portable application or alternatively a collection or suite of portable applications. Individual functions and instructions in the portable application that desire access to the store interact with an API exposed by the intermediary. The intermediary in turn interacts with the API exposed by the private store. Such a structure with an intermediary can be helpful to the application designer, as the designer can design the application functions and instructions without regard for whether the application will be a non-portable application that accesses the system information store or a portable application that accesses the private store, and then design two intermediaries (one for use with portable applications accessing the private store, and the other for use with non-portable applications accessing the system information store).

In certain situations, a portable application may need or desire to retrieve information from the store that was not previously stored in private store 164. In such situations, the portable application (or the intermediary) can access the system information store on the host computer to read the desired information. Such information would typically be information that is not specific to the portable application(s), but rather is general information about the host computer. The portable application (or the intermediary) is designed to know, for particular information that is desired by the portable application, whether the system information store should be accessed to obtain the particular information or whether private store 164 should be accessed to obtain the particular information. Note, however, that any information to be written to or deleted from the store would not be written to or deleted from the system information store.

Alternatively, when portable storage device 102 is coupled to a host computer, the information in the system information store of that host computer may be copied into private store 164, although any data that is already in private store 164 would not be overwritten by this copying. So, in this alternate embodiment, the situation where the portable application is accessing information that was not previously stored in private store 164 should not arise. In other alternate embodiments, private store 164 may be pre-programmed or configured with default values that are used until they are overwritten by a portable application.

Similar to private store 164, portable storage device 102 also includes a private local profile 166. Private local profile 166 stores a local profile for the user of portable storage device 102, storing various user setting and preferences information. By saving such information, the portable storage device 102 allows the user to customize his or her experience and have that customization maintained even though he or she may be using the portable storage device 102 with multiple different host computers. A separate private local profile 166 may be maintained for each portable application, or alternatively a single private local profile 166 may be maintained for a collection or suite of portable applications.

Private local profile 166 is used to store such information rather than a local profile that is typically found on the host computer. Similar to private store 164, private local profile 166 is accessed by portable applications, optionally via an intermediary on behalf of the portable applications, and the requested data is retrieved, written to, deleted, modified, etc. as appropriate based on the action requested by the portable application. Private local profile 166, as well as any intermediary, may expose an API analogous to the discussion above regarding private store 164.

In certain embodiments, read accesses to the local profile are directed (e.g., by an intermediary) to the local profile that is stored on the host computer in the event that the data being read is not present in private local profile 166. Alternatively, the local profile stored on the host computer may be copied into private local profile 166, although data for any settings that is already present in private local profile 166 would not be overwritten by this copying process. In other alternate embodiments, private local profile 166 may be pre-programmed or configured with default values that are used until they are overwritten by a portable application.

Thus, by maintaining the application files as well as the application data, the information store data, and the local profile data on portable storage device 102, no permanent changes need be made to the host computer. No changes to the system information store on the host computer or to the local profile on the host computer are made when executing, or in order to execute, a portable application on portable storage device 102. The information stored in the system information store and local profile of the host computer can be referred to as the environment settings on the host computer, and no changes to such environment settings are made when executing a portable application. Additionally, the application files as well as data files are stored on portable storage device 102, so none of the application files or data files are written to the host computer.

In certain embodiments, no files or environment settings are written to the host computer when executing a portable application. If the portable application does make use of any temporary files during execution, these temporary files are stored on portable storage device 102 rather than on the host system. In alternate embodiments, one or more temporary files may be written to the host computer during execution of a portable application. A portable application that writes temporary files to the host computer during execution deletes those temporary files as part of closing itself when execution of the application is terminated. Alternatively, the portable application may rely on another component, such as the operating system on the host computer, to delete those temporary files when the portable application stops running or at regular or irregular intervals.

Additionally, in certain embodiments portable storage device 102 may have a particular host computer that it synchronizes data files with. An application on this "home" or "base" host computer, or alternatively on portable storage device 102, would detect when the portable storage device 102 is coupled to the home or base host computer, and then check whether any modifications have been made to the data files in data section 168 (e.g., based on last modified date and time of the data files, or the addition or deletion of any data files). Any new files, or any files which have a newer last modified date and time than on the home or base host computer, are then copied over to the home or base computer. The user may optionally be prompted to verify that he or she desires such synchronization to occur.

Figure 3:
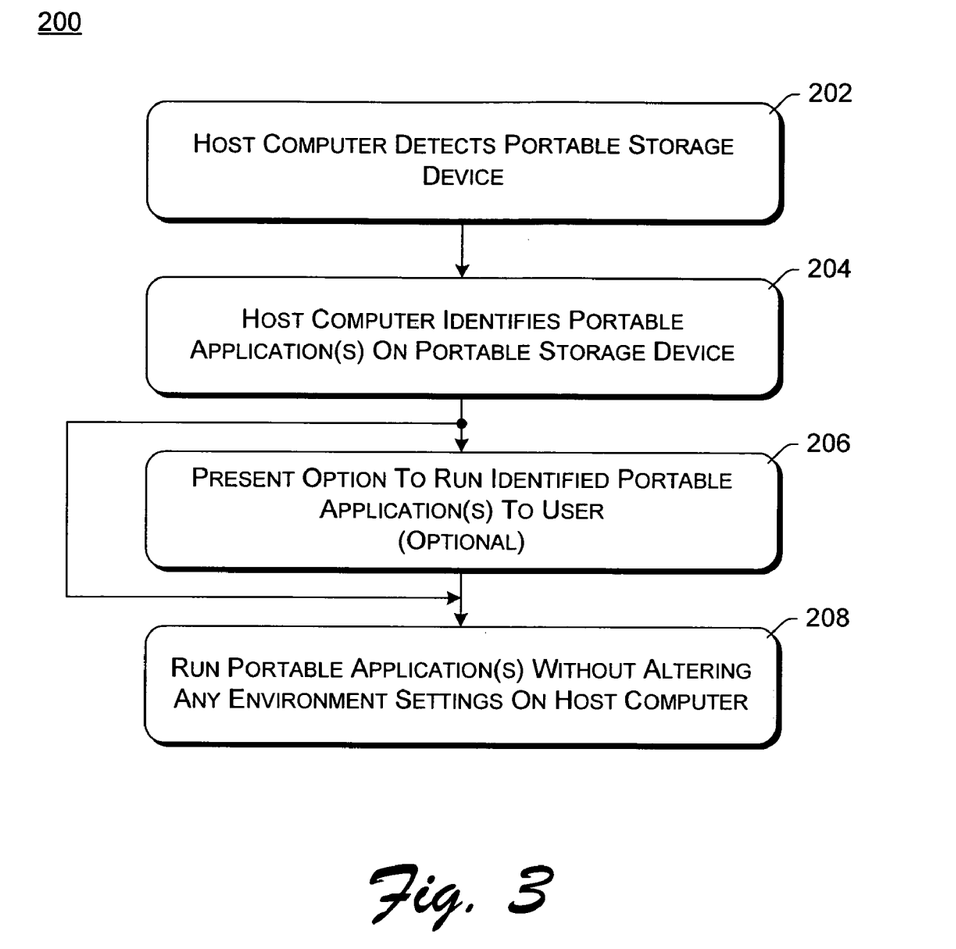
FIG. 3 is a flowchart illustrating an example process for executing a portable application.

FIG. 3 is a flowchart illustrating an example process 200 for executing a portable application. Process 200 is performed by a host computer to which the portable storage device is coupled. Process 200 may be implemented in software, firmware, hardware, or combinations thereof.

Initially, the host computer detects the portable storage device (act 202). As discussed above, this detection is performed automatically when the portable storage device is plugged into or otherwise coupled to the host computer.

The host computer then identifies the portable application(s) on the portable storage device (act 204). As discussed above, this identification can be performed automatically by the host computer, or can be performed manually by the user navigating to the portable storage device. An option to run the identified portable application(s) can then optionally be presented to the user (act 206). As discussed above, a user interface may be displayed to the user allowing the user to select which portable application(s) he or she would like to run. Alternatively, the host computer may automatically select one or more of the portable application(s) on the portable storage device to be run.

The identified portable application(s) are then run on the host computer without altering any environment settings on the host computer (act 208). As discussed above, a private store and private local profile are maintained on the portable storage device, so no changes to the system information store, or profile, stored on the host computer need be made during execution of the portable application.

Returning to FIG. 2, one current technique used by some application manufacturers in order to ensure that licensing obligations are being met by the user is to require the user to activate the application after installing the application on the user's computer. The application typically requires that this activation be performed within a particular timeframe, such as within a particular number of days of the first time the application is run, or before the application is run a certain number of times. The activation process binds the application to a particular computer, associating a particular copy of the application with a particular computer. The activation process typically involves the user or some other individual entering an alphanumeric sequence or key that accompanies the copy of the application. If the application is not successfully activated within the required timeframe then the application either cannot be run, or can be run only with reduced functionality (e.g., without certain features or functional portions), until the application is successfully activated.

By maintaining the association of a particular copy of the application with a particular computer, the application manufacturer can detect if an attempt is made to bind the same copy of the application to multiple computers. If using the same copy of the application on multiple computers violates the licensing agreement, as is oftentimes the case, then activation of the copy on the second or subsequent computers can be denied and the terms of the licensing agreement upheld.

However, such an activation technique in which applications are bound to a particular computer is undesirable in the case of portable applications because one of the ideas behind portable applications is that the portable storage device on which they are stored can easily be moved from one computer to another and run on both computers. Thus, in the case of a portable application, the portable application is bound to the portable storage device rather than to a particular computer.

Portable applications are bound to a portable storage device by using an identifier of the portable storage device. Such an identifier is designed so that it is very unlikely for two different portable storage devices to have the same identifier. Thus, such an identifier can be used to determine whether an attempt is made to bind the same application to multiple different portable storage devices.

The identifier of the portable storage device can be generated in different ways. The identifier could be assigned by the manufacturer and included in the portable storage device during the manufacturing process, or as part of a pre-configuration process employed by the manufacturer. The identifier could be included in a non-rewriteable portion of the portable storage device, such as a portion using memory that can be written to once but never erased or re-written, so that it cannot be subsequently changed.

Alternatively, the identifier of the portable storage device may be a signature of the device that is based on various hardware aspects of the portable storage device. This signature can be generated by an application on the portable storage device, such as the portable application that is being activated or by some other application. The signature can be stored on the portable storage device for subsequent use, or may be regenerated each time it is needed. Alternatively, the signature can be generated by some other component (e.g., by a system of the manufacturer of the portable storage device) and stored on the portable storage device.

In another alternative, the identifier of the portable storage device is communicated, either directly or indirectly, from a processing component on the portable storage device. For example, the processing component can include a cryptographic processor that can perform public-key cryptographic operations. A challenge (e.g., a sequence of alphanumeric characters and/or other symbols) can be communicated to the cryptographic processor from a requester, such as the device or service that is binding the portable application(s) to the portable storage device. The cryptographic processor encrypts the challenge using the private key of the cryptographic processor and returns the encrypted challenge to the requestor. The requestor can then use the known public key of the cryptographic processor to verify the identity of the cryptographic processor, and thus the identity of the portable storage device on which the cryptographic processor resides. As each cryptographic processor would have a different public/private key pair, the different portable storage devices can be separately identified.

Once activated, information may be written back to the portable storage device so that the portable application on the portable storage device knows that it has been successfully activated. Alternatively, rather than writing any such data back to the portable storage device, the portable application may use a network connection of the host computer to access a server (e.g., via the Internet) to check whether the application has been successfully activated.

Figure 4:
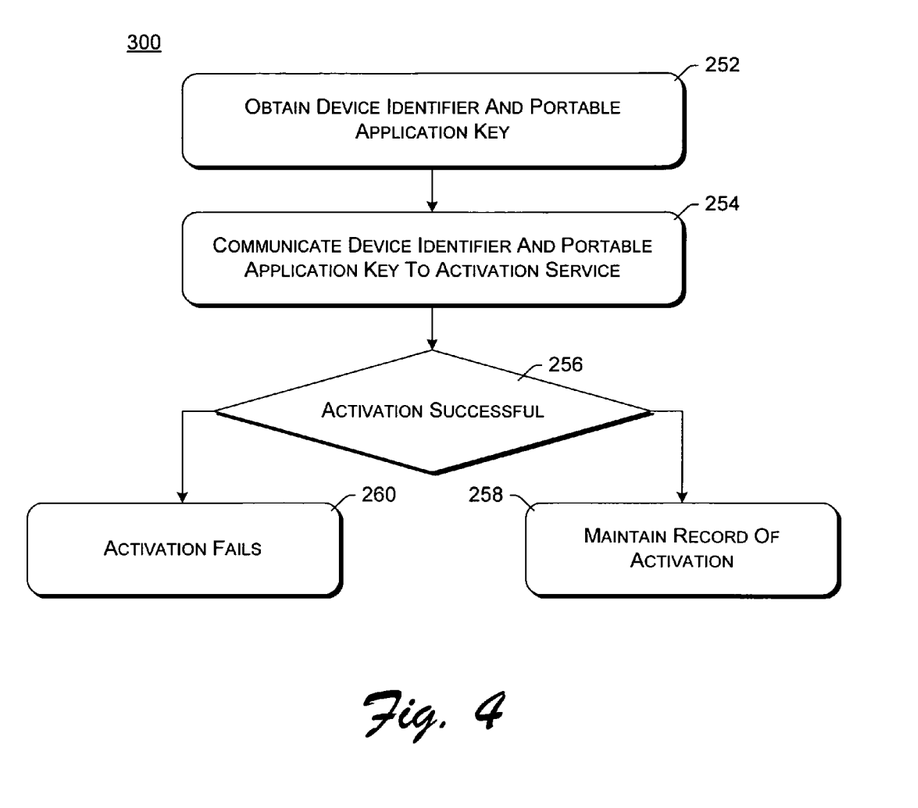
FIG. 4 is a flowchart illustrating an example process for activating a portable application.

FIG. 4 is a flowchart illustrating an example process 250 for activating a portable application. Process 250 may be implemented in software, firmware, hardware, or combinations thereof.

Initially, the device identifier and portable application key are obtained (act 252). The device identifier can be obtained by retrieving the identifier previously stored to the portable storage device, or alternatively by generating the identifier (e.g., a signature of the portable storage device as discussed above). The portable application key can be obtained in different manners, but is typically obtained by the user manually entering the key into the host computer that the portable storage device is coupled to. This key can be included, for example, in the packaging when the portable application or the portable storage device with the portable application already installed is purchased. Each copy of a portable application is typically assigned a different key.

The device identifier and portable application key are then communicated to an activation service (act 254). The activation service is a service implemented on one or more devices and is responsible for determining whether the portable application has already been bound to a maximum number of permitted devices. This determination is made by analyzing a record of previously activated applications and checking whether the portable application key is already associated with a maximum number of permitted devices (based on the license associated with the portable application). The activation service is also responsible for determining the validity of the portable application key. The validity of the portable application key can be determined in any of a variety of manners, such as having a list of valid keys, having an algorithm that processes the portable application key to determine validity, and so forth.

Process 250 then continues based on whether the activation of the portable application is successful (act 256). If the portable application key has not already been bound to a maximum number of permitted devices (or if the portable application key previously been bound to this device identifier), and the portable application key is a valid key, then the activation is successful. However, if the portable application key has already been bound to a maximum number of permitted devices, or if the portable application key is not a valid key, then the activation is not successful.

If the activation is successful, then the activation service maintains a record that the portable application key is associated with the device identifier (act 258). An indication that the portable application has been activated is returned to the portable application, and an indication that the portable application has been activated may also be stored on the portable storage device, as discussed above. This indication can be, for example, a particular identifier or data value, a digital certificate the authenticity of which can be verified by the portable application using cryptographic algorithms, and so forth. However, if the activation is not successful, then the activation fails (act 260) and an indication that the activation has failed is returned to the portable application.

Returning to FIG. 2, portable applications can be pre-installed on portable storage device 102, or alternatively installed by the user. Portable applications can be pre-installed by the manufacturer of portable storage device 102 or by some other entity (e.g., a reseller, distributor, third party hired by the manufacturer, and so forth). Thus, the user would purchase portable storage device 102 with one or more portable applications already installed thereon. Alternatively, one or more portable applications may be installed on portable storage device 102 by the user. For example, the user may purchase a portable application on a disc or over a network (such as the Internet), and install the purchased application on portable storage device 102.

During the installation process, whether it is performed by a purchaser of portable storage device 102 or by some other individual, the necessary files are copied to storage element 108 as application files 112, and any necessary changes to or configuration of those files is carried out. Additionally, any information that would typically be written to the system information store as part of the installation process is instead written to private store 164. Typically, a setup file is executed to install the portable application. When executed, the setup file performs these various functions in order to install the application.

Figure 5:
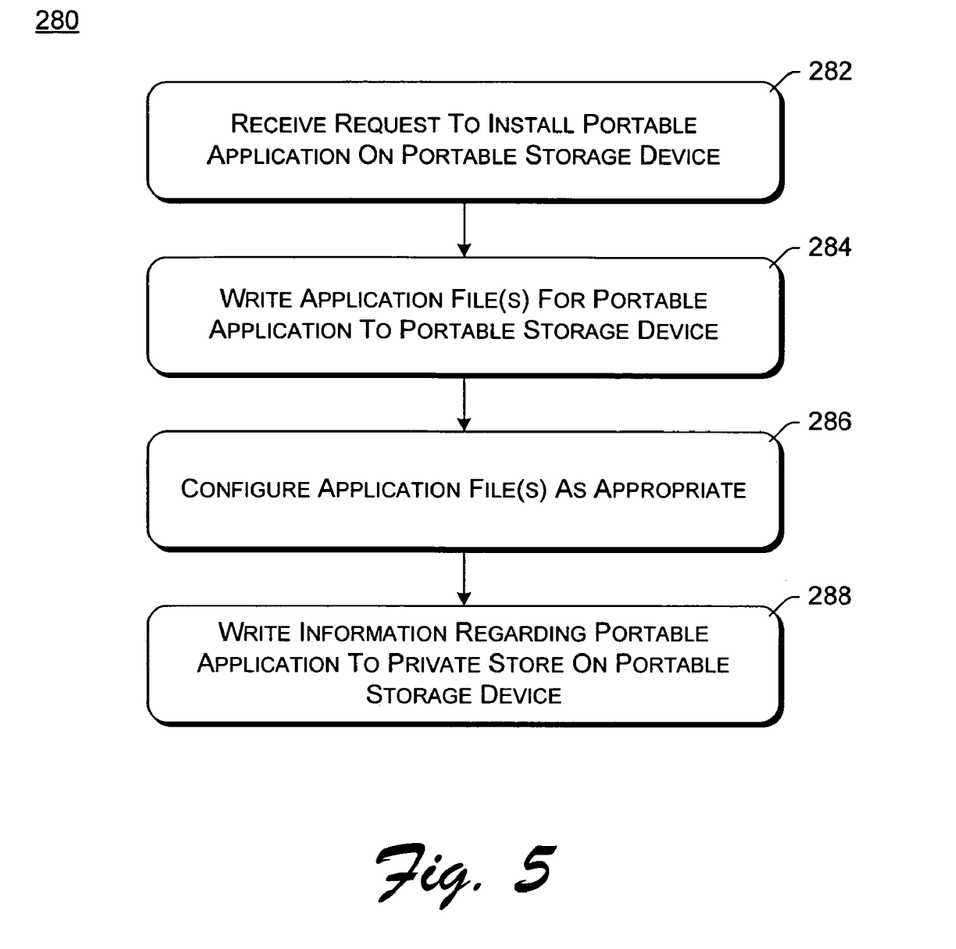
FIG. 5 is a flowchart illustrating an example process for installing a portable application on a portable storage device.

FIG. 5 is a flowchart illustrating an example process 280 for installing a portable application on a portable storage device. Process 280 may be implemented in software, firmware, hardware, or combinations thereof.

Initially, a request to install a portable application on a portable storage device is received (act 282). This request may be a manual user selection, such as the user double-clicking on an "install" or "setup" icon, or dragging and dropping one or more files (such as an "install" or "setup" file or icon) from a source media to the portable storage device. The request alternatively may be inherent in some other action, such as insertion of an installation disc into the same computer that the portable storage device is coupled to, or the coupling the portable storage device to a particular computer (e.g., at the manufacturer or some other third party location).

In response to the request, one or more application files for the portable application are written to the portable storage device (act 284). These application files are, for example, application files 162 of FIG. 2. The application files are then configured as appropriate (act 286). What configuration, if any, is needed as part of the installation process can vary for different portable applications. Any such configuration that is needed is typically identified in an installation file that is associated with the portable application (and which typically implements process 280).

In addition to configuring the application files, autorun module 160 may also be configured in act 286. This configuration of autorun module 160 includes adding to autorun module 160 information identifying the presence of the portable application on the portable storage device, as well as information regarding how to execute the portable application (e.g., which file(s) to execute to begin running the portable application, which folder files for the portable application are stored, and so forth).

Information regarding the portable application is then written to the private store on the portable storage device (act 288). The information written to the private store can be any information regarding the portable application, such as configuration settings for the application, performance tuning parameters to increase the performance of the application when it is running, which file types are associated with the portable application (e.g., so that appropriate icons are displayed for files of that type in order to visually identify to the user that the files are associated with the portable application), and so forth. As discussed above, such information is written to the private store on the portable storage device rather than the system information store on the computer to which the portable storage device is coupled. In some situations, the private store may not yet be created the first time act 288 is performed for a particular portable storage device. In such situations, the private store is created on the portable storage device as part of act 288.

It should be noted that, in alternate embodiments, the installation process may differ. For example, a drag and drop technique may be used where one or more files are copied from a source media to the portable storage device. By way of another example, rather than executing an installation process 280, such as from an installation file, an image of the storage element(s) may be created that includes all of the executable files, private store, private local profile, and autorun module as it should exist after installation of the portable application(s). This image can then simply be copied onto the storage element(s) of the portable storage device, resulting in a portable storage device with all the needed executable files, as well as private store and/or private local profile populated with the appropriate data. Such a process of pre-generating an image and copying that image onto the portable storage device would typically be used by a manufacturer of the portable storage device or other third party that is manufacturing, distributing, or selling a large number of portable storage devices configured with the same portable applications.

Returning to FIG. 2, it should be noted that, although module 160, files 162, store 164, profile 166, and data section 168 are illustrated as being included in storage element(s) 108, alternatively one or more of these components, or portion(s) of one or more of these components, may be stored in a different type of memory. For example, a non-rewriteable read only memory may be used for one or more components or portions thereof, rather than the rewriteable storage elements. The components or portions thereof that would be stored in non-rewriteable read only memory would be those components or portions that would not be changeable, such as particular instructions for an application (portions or all of application files 162), instructions for the autorun functionality discussed herein (portions or all of autorun module 160), and so forth.

Additionally, it should be noted that portable storage device 102 can be any of a variety of different devices. For example, portable storage device 102 may be a portable USB flash memory storage device, a portable hard disk drive device, or some other device that includes flash memory or other storage element(s), such as a digital camera.

Thus, it can be seen that the portable applications discussed herein allow for easy portability of applications on a portable storage device. The portable applications can be run on different host computers simply by plugging the portable storage device into, or otherwise coupling the portable storage device to, the different host computers. No changes to environment settings are made to any of the host computers, and no files are installed on any of the host computers. Thus, the environment settings on the host computer remain the same even though a portable application is run on the host computer, and the user's privacy is maintained because the portable application leaves behind no files or settings that may reveal information about the user or the data he or she was working on.

Figure 6:
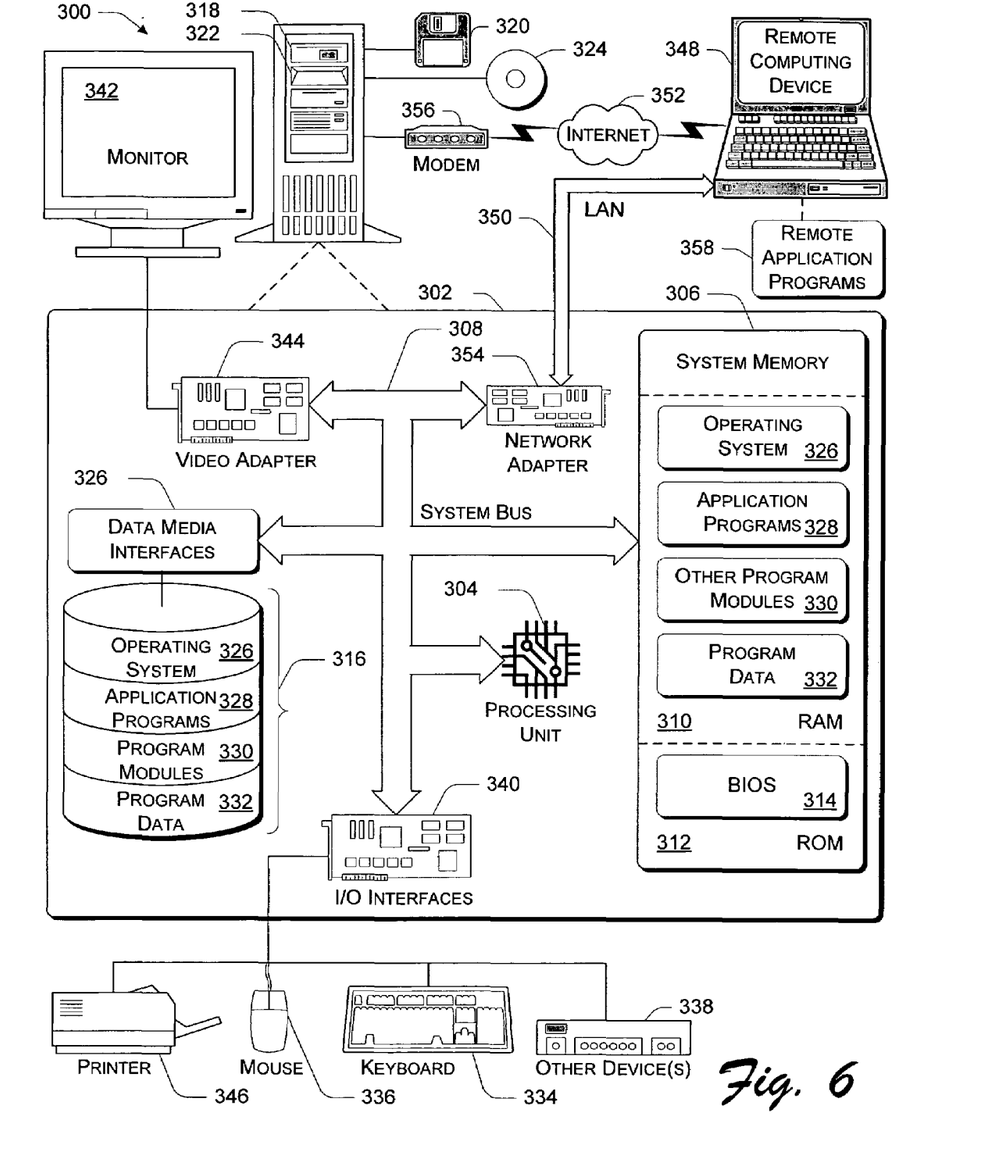
FIG. 6 illustrates a general computer environment in which the portable applications described herein can be used.

FIG. 6 illustrates a general computer environment 300 in which the portable applications described herein can be used. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the exemplary computer environment 300.

Computer environment 300 includes a general-purpose computing device in the form of a computer 302. Computer 302 can be, for example, a host computer 104 of FIG. 1. The components of computer 302 can include, but are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 6 illustrates a hard disk drive 316 for reading from and writing to a non-removable, non-volatile magnetic media (not shown), a magnetic disk drive 332 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 332, and optical disk drive 322 are each connected to the system bus 308 by one or more data media interfaces 326. Alternatively, the hard disk drive 316, magnetic disk drive 332, and optical disk drive 322 can be connected to the system bus 308 by one or more interfaces (not shown). Additional computer storage media may also be included as part of computer 302, such as a portable flash storage device as discussed above.

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, a universal serial bus (USB), or a Firewire (IEEE 1394) bus.

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A portable storage device comprising:
an interface; and one or more storage elements, coupled to a host computer through the interface, that store one or more applications that can be executed by the host computer, with the host computer identifying and installing device driver information specific to one or more storage elements on the host computer such that the host computer detects a presence of the one or more storage elements while not maintaining information specific to the applications in a system information store of the host computer by having the applications queried regarding functionality of each of the applications through an operating system of the host computer, the one or more storage elements comprising:
a private store to maintain environment settings associated with the applications and to receive requests to access environment settings of the applications of the one or more storage elements without altering environment settings of the host computer, and in response to the requests, accessing the environment settings in the private store rather than the environment settings on the host computer, wherein the private store is configured with a separate private local profile for each of the applications; and
an autorun module that is accessed by the host computer to present a user interface identifying applications that can be run by executing corresponding executable files in the one or more storage elements, wherein the autorun module is configured with information necessary to execute each of the applications of the one or more storage elements,
wherein each application requires activation upon being executed by the host computer for a first time, wherein activation binds the application uniquely to the portable storage device through use of an identifier identifying the portable storage device so the application can only be executed from the bound portable storage device, wherein activation comprises writing activation information to the portable storage device, and wherein activation allows execution of each application for each time after the first time by the host computer or by another computer to which the portable storage device is coupled.

2. A portable storage device as recited in claim 1, wherein the portable storage device includes no processor to execute instructions of the one or more executable files.

3. A portable storage device as recited in claim 1, wherein the autorun module presents, as part of the user interface, an icon associated with one of the applications for a data file of a type associated with the one application, the one or more storage elements storing the data file.

4. A portable storage device as recited in claim 1, wherein the autorun module automatically runs one of the applications when a file associated with the one application is selected by a user.

5. A portable storage device as recited in claim 1, wherein the one or more storage elements also store a plurality of data files, wherein some of the plurality of data files are associated with the one or more executable files and some of the plurality of data files are associated with none of the one or more executable files.

6. A portable storage device as recited in claim 1, wherein the one or more executable files are executed to run an application that is bound to the portable storage device.

7. A portable storage device as recited in claim 1, wherein the one or more storage elements comprise one or more flash memories.

8. A portable storage device as recited in claim 7, wherein the portable storage device comprises a Universal Serial Bus (USB) flash memory device.

9. A portable storage device as recited in claim 1, wherein each of the separate private local profiles is pre-programmed with default values until over written by a respective application.

10. A portable storage device as recited in claim 1, wherein any temporary file created by an application is written to the private store and not the host computer.

11. A method, implemented in a host computer, the method comprising:
coupling a portable storage device to the host computer;
identifying and installing device driver information specific to the portable storage device on the host computer such that the host computer detects a presence of the portable storage device;
identifying a portable application stored on the portable storage device; and
executing the portable application by the host computer without maintaining information of the portable application on a system information store of the host computer by having the portable application queried regarding functionality thereof through an operating system of the host computer;
with the portable application having a private store, receiving requests to access environment settings on the host computer and in response to the requests, accessing the environment settings in the private store rather than the environment settings on the host computer such that the environment settings on the host computer are not altered, wherein the private store comprises a separate private local profile for the portable application separate from a private local profile for each of any other portable application,
wherein the portable application requires activation upon being executed by the host computer for a first time, wherein activation binds the application uniquely to the portable storage device through use of an identifier identifying the portable storage device so the portable application can only be executed from the bound portable storage device, wherein activation comprises writing activation information to the portable storage device, and wherein activation allows execution of the portable application for each time after the first time by the host computer or by another computer to which the portable storage device is coupled.

12. A method as recited in claim 11, wherein identifying the portable application further comprises:
presenting an user interface identifying a plurality of portable applications stored on the portable storage device; and
receiving an user selection of one of the plurality of portable applications to be executed.

13. A method as recited in claim 11, wherein running the portable application further comprises running the portable application without requiring any additional driver to be installed on the computer.

* * * * *